United States Patent [19]

Gnaedinger et al.

[11] Patent Number: 4,634,307
[45] Date of Patent: Jan. 6, 1987

[54] QUICK-DISCONNECT CONNECTOR

[76] Inventors: Donald J. Gnaedinger, 90 Sundew La., Highland, Ill. 62249; Dennis J. Potthast, 149 E. Dunn, Edwardsville, Ill. 62025

[21] Appl. No.: 829,166

[22] Filed: Feb. 14, 1986

[51] Int. Cl.⁴ .............................................. F16B 9/00
[52] U.S. Cl. ................................ 403/194; 403/407.1; 403/259; 285/162
[58] Field of Search ............... 403/194, 196, 201, 197, 403/238, 239, 407.1, 259, 200, 192; 285/162, 161, 321; 24/614, 615; 411/517, 353, 395

[56] References Cited

U.S. PATENT DOCUMENTS 2,498,590  2/1950  Straus ............................... 403/326 X
2,577,009  12/1951  Frantz .............................. 285/321 X

FOREIGN PATENT DOCUMENTS 1458261  11/1966  France ................................ 285/161

Primary Examiner—Andrew V. Kundrat
Attorney, Agent, or Firm—Senniger, Powers, Leavitt and Roedel

[57] ABSTRACT

A connector for connecting a base and column of a microphone stand or the like. The connector comprises a cylindric male member having a first end portion adapted for connection to the column and a second end portion having an external annular groove therein. A retaining spring carried in the groove is compressible from an expanded configuration wherein it projects partially out of the groove to a compressed configuration wherein it lies entirely within the groove. The connector further includes a female member adapted for connection to the base of the microphone stand. The female member has a bore therethrough sized to receive the second end portion of the male member with relatively minimal clearance. The length of the bore is only slightly less than the distance the groove is spaced from the first end portion of the male member. Therefore, when the second end portion of the male member is inserted into one end of the bore through the female member, the retaining spring is adapted to move to its compressed configuration, permitting passage of the male member into the bore to a locking position wherein the second end portion of the male member projects endwise beyond the other end of the bore. The retaining spring is adapted to spring outwardly to its expanded configuration when the male member is in its locking position, wherein it is adapted for engagement with the female member to retain the male member therein, thereby securing the column to the base. The male member can be withdrawn from the female member, thereby detaching the column from the base, by exerting an axial withdrawing force on the column sufficient to compress the retaining spring to its compressed configuration. The connector is designed for preventing relative rotation between the male and female members when the male member is in the locking position.

14 Claims, 8 Drawing Figures

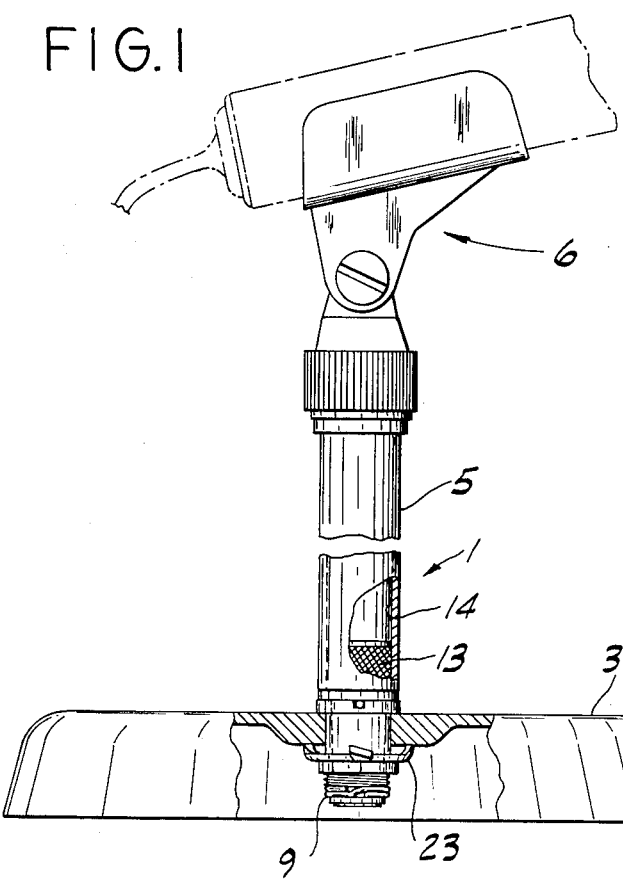
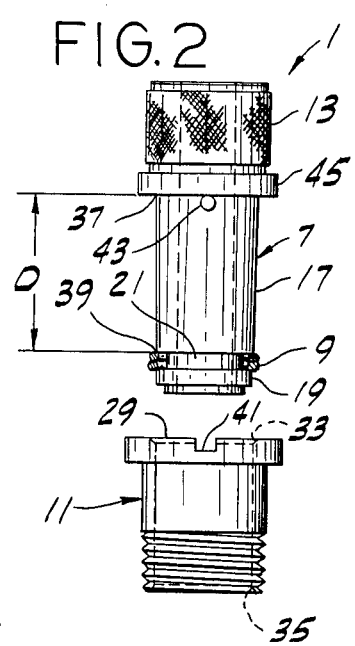
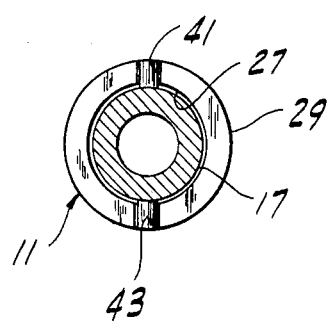
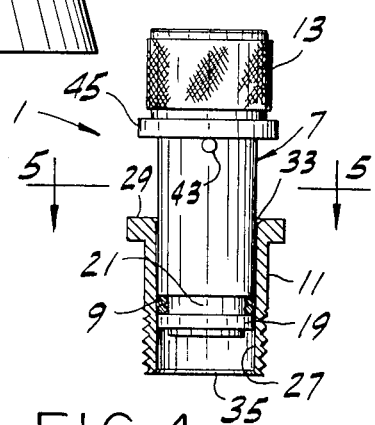
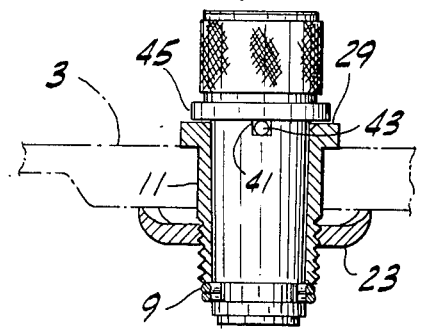

QUICK-DISCONNECT CONNECTOR

BACKGROUND OF THE INVENTION

This invention relates generally to quick-disconnect connectors, and more particularly to an improved quick-disconnect connector for a microphone stand or the like.

The need for some means for quickly assembling and disassembling microphone stands has become more urgent as the equipment requirements for rock concerts, etc. has expanded. Typically there may be a dozen or more microphones placed around the stage and it is necessary to set up and break down the equipment for each concert with the microphone stands presenting a time- and space-consuming problem. The bases are typically 10-12 inches in diameter and cast of heavy metal and the column is typically a length of heavy-wall tubing with fine threads at the bottom end which are threaded into the base. These are awkward to transport and store unless taken apart and unthreading the column from the base can take a substantial amount of time.

SUMMARY OF THE INVENTION

Among the several objects of the invention may be noted the provision of a quick-disconnect connector for a microphone stand or the like that facilitates easy and quick set-up and break-down of the stand. Also, some other objects of this invention are the provision of a quick-disconnect connector which is sturdy, economical in cost, reliable in operation, not prone to accidental disconnection, and which does not allow inadvertent rotation or movement when connected.

Generally, a connector of the present invention is adapted for detachably connecting the base and column of a microphone stand or the like. The connector comprises a generally cylindric male member having a first end portion adapted for connection to the column of the microphone stand and a second end portion having an external annular groove spaced axially of the male member from the first end portion. Spring retaining means is carried in the groove, and is compressible from an expanded configuration wherein it projects partially out of the groove to a compressed configuration wherein it lies entirely within the groove. The connector further includes a female member adapted for connection to the base of the microphone stand. The female member has a generally circular bore therethrough sized to receive the second end portion of the male member with relatively minimal clearance. The length of the bore is only slightly less than the distance the groove is spaced from the first end portion of the male member. Therefore, when the second end portion is inserted into one end of the bore through the female member, the spring retaining means is adapted to move to its compressed configuration, permitting passage of the male member into the bore to a locking position wherein the second end portion of the male member projects endwise beyond the other end of the bore. The spring retaining means is adapted to spring outwardly to its expanded configuration at the locking position, wherein it is adapted for engagement with the female member to retain the male member in the female member and thereby secure the column to the base. Exerting an axial withdrawing force on the column sufficient to compress the spring retaining means to its compressed configuration permits the male member to be withdrawn from the female member, thereby detaching the column from the base. The connector has means adapted for preventing relative rotation between the male and female members when the male member is in the locking position.

Other objects and features will be in part apparent and in part pointed out hereinafter.

BRIEF DESCRIPTION OF THE DRAWINGS

FIG. 1 is a side elevation of a connector of the present invention securing together a column and a base, partially broken away, of a microphone stand;

FIG. 2 is enlarged, exploded view of the connector of FIG. 1;

FIG. 3 is an enlarged side view showing a male member partially inserted into a female member of the connector of FIG. 1;

FIG. 4 is an enlarged side view showing the male member in a locking position;

FIG. 5 is a cross sectional view taken along line 5—5 in FIG. 3;

Corresponding reference characters indicate corresponding parts throughout the several views of the drawings.

DESCRIPTION OF PREFERRED EMBODIMENTS

Figure 6:
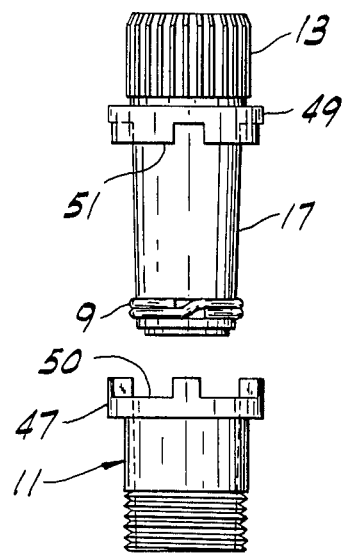
FIG. 6 is an enlarged, exploded view similar to FIG. 2 showing another embodiment of the connector.

Referring now to the drawings, a quick-disconnect connector of the present invention is designated in its entirety by the reference numeral 1. As shown in FIG. 1, the connector 1 is especially adapted for connecting a base 3 and a column 5 of a microphone stand generally designated 6, although it will be understood that the connector may have other uses. The connector comprises a generally cylindric male member 7, a retaining spring 9, and a female member 11 (FIG. 2).

More specifically, the male member 7 has a first upper end portion 13 adapted to be secured to the column 5. For example, as shown in FIG. 1, the column 5 may have a tubular section 15, which is sized for a press fit with the upper end portion 13 of the male member. For greater retention within the column, the upper end portion 13 of the male member 7 may be knurled or splined. It is also understood that the upper portion could be threaded to secure to the existing thread on column 5.

The male member also has a second lower end portion 17 adapted for connection to the female member 7. The lower end portion has an external annular groove 21 therein spaced axially of the male member from the upper end portion. Preferably, the lower end portion of the male member beyond the groove (at 19) has a diameter (e.g., 9/16 inch) greater than the inside diameter of the groove 21 (e.g., ½ inch) and less than the outside diameter of the lower end portion between the upper end portion 13 and the groove (e.g., 10/16 inch). This reduced diameter at 19 is helpful in guiding the male member into the female member and preventing enlargement of the end beyond the 10/16 diameter of the male member while it is being driven into the column upon assembly.

The retaining spring 9 is carried in groove 21. It is compressible from an expanded configuration (e.g., FIGS. 2 and 4) wherein it projects partially out of the groove to a compressed configuration (e.g., FIG. 3) wherein it lies entirely within the groove. Preferably, the retaining spring is a helical spring washer, wherein the spring wire (having 1/16 inch diameter) makes almost two revolutions (about 680 degrees) around the male member. An example of such a washer is a ring of the type commonly used in keyrings. This retaining spring 9 constitutes spring retaining means.

The female member 11 is adapted for connection to the base 3 of the microphone stand. It is generally cylindric in shape and has a radial flange 29 at its upper end. A retaining nut 23 is threadable on the lower end of the female member for securing the female member to the base 3 of the microphone stand, as shown in FIG. 4. The female member may otherwise be threaded to utilize the existing thread in the base 3 of the microphone stand. The female member has a circular bore 27 therethrough sized to receive the lower end portion 17 of the male member with relatively minimal clearance. The length of the bore 27 is only slightly less than the distance D the groove 21 is spaced below the upper end portion 13 of the male member. Therefore, when the lower end portion 17 of the male member is inserted into one (the upper) end of bore 27, the retaining spring 9 is adapted to move to its compressed configuration (e.g., FIG. 3), thereby permitting passage of the male member into the bore to a locking position (e.g., FIG. 4) in which the lower end portion of the male member projects endwise beyond the other (lower) end of bore 27. On reaching this locking position, the retaining spring 9 is adapted to spring outwardly to its expanded configuration, wherein it is adapted for engagement with the female member (at its lower end) to retain the male member 7 in the female member and thereby secure the column to the base.

The column 5 is detachable from the base 3 by exerting an axial withdrawing force on the column sufficient to compress the retaining spring 9 to its compressed configuration, which permits the lower end portion 17 of the male member to be withdrawn from the female member 11.

Referring to FIG. 2, the bore 27 through the female member 11 preferably has chamfers 33 and 35 at each end thereof, which cause the male member 7 to be easier to insert and withdraw from the female member. The chamfer 33 at the upper end of the bore 27 is more gradual than the chamfer 35 at its lower end, so that the male member requires relatively low force to be inserted into the female member and somewhat greater force to be withdrawn from the female member. For example, the upper chamfer 33 may be at an angle of approximately 30 degrees relative to the axis of the bore 27, and the lower chamfer 35 may be at an angle of approximately 45 degrees relative to the axis of the bore.

The lower end portion 17 of the male member is preferably tapered in the direction away from its upper end portion, and the bore 27 of the female end may be tapered in the direction toward its lower end. In other words, the diameter of the male member at 37 is preferably greater than its diameter at 39, and the bore of the female member may have a taper complementary to the taper of the male member whereby the male member fits snugly within the female member at the locking position. The male member may be adapted for a close fit within the bore to minimize side-to-side movement of the male member therein, thereby insuring stability of the column. Alternatively, the bore 27 of the female member and the lower portion 17 of the male member may each be generally cylindrical. The lower portion of the male member and the bore of the female member are then sized to fit together with only the minimum clearance required for insertion of the male member.

In one preferred embodiment (see FIGS. 1-5), the female member has a slot 41 at its upper end which receives a pin 43 extending radially outwardly from the male member when the male member is in its locking position (e.g., FIG. 4). The pin may be of generally tubular spring steel with an open section along one side. Such pins are commonly referred to as, and sold under the trade designation, "Rollpins" by the Elastic Stop Nut Corporation of America of Union, N.J. It will be understood, therefore, that slot 41 and pin 43 constitute one means for preventing relative rotation between the male and female members (and thus between the column 5 and base 3) when the male member is in the locking position.

Additionally, a collar 45 may be provided between the upper end portion 13 and lower end portion 17 of the male member. The collar (constituting stop means) is engageable with the flange 29 at the upper end of the female member thereby to limit insertion of the male member into the female member substantially beyond the locking position.

Figure 8:
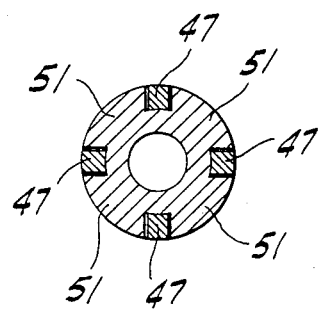
FIG. 8 is a cross sectional view taken along line 8—8 in FIG. 7.
Figure 7:
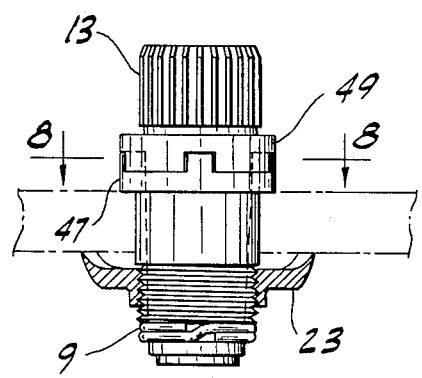
FIG. 7 is an enlarged side view similar to FIG. 4 of the connector of FIG. 6.

In another embodiment (see FIGS. 6-8), the female member has a crenelated collar 47 at its upper end (in lieu of flange 29), engageable by a complementary crenelated collar 49 on the male member between its upper and lower end portions (13 and 17, respectively) when the male member is in the locking position (e.g., FIG. 7). The crenelated collar 47 of the female member and complementary collar 49 of the male member have notches 50 and depending lugs 51, respectively, which are sized to fit together without excessive freeplay (see FIG. 8). It will be understood, therefore, that crenelated collars 47 and 49 constitute another means for preventing relative rotation between the male and female members when the male member is in the locking position.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A connector for connecting a base and a column of a microphone stand or the like, said connector comprising:
    a generally cylindric male member having a first end portion adapted for connection to the column of the microphone stand and a second end portion having an external annular groove spaced axially of the male member from the first end portion;
    spring retaining means carried in said groove compressible from an expanded configuration wherein it projects partially out of the groove to a compressed configuration wherein it lies entirely within said groove;

a female member adapted for connection to the base of the microphone stand, said female member having a generally circular bore therethrough sized to receive the second end portion of said male member with relatively minimal clearance, the length of said bore being only slightly less than the distance said groove is spaced from said first end portion of the male member whereby when said second end portion of the male member is inserted into one end of the bore through the female member the spring retaining means is adapted to move to its compressed configuration to permit passage of said male member into said bore to a locking position wherein the second end portion of the male member projects endwise beyond the other end of the bore and wherein said spring retaining means is adapted to spring outwardly to its expanded configuration, said spring retaining means in its expanded configuration being adapted for engagement with the female member to retain the male member in said female member and thereby secure the column to the base, said column being detachable from the base by exerting an axial withdrawing force on the column sufficient to compress said spring retaining means to its compressed configuration to permit said male member to be withdrawn from said female member; and means adapted for preventing relative rotation between the male and female members when the male member is in said locking position.

2. A connector as set forth in claim 1 wherein said spring retaining means comprises a helical spring washer.

3. A connector as set forth in claim 1 further comprising stop means on the male member engagable with said female member for limiting insertion of the male member into said female member substantially beyond said locking position.

4. A connector as set forth in claim 3 wherein said stop means comprises a collar between said first and second end portions of the male member.

5. A connector as set forth in claim 1 wherein said column has a tubular section, said first end portion of the male member being sized for a press fit within said tubular section of the column.

6. A connector as set forth in claim 5 wherein said first end portion of the male member is knurled.

7. A connector as set forth in claim 1 wherein said means for preventing relative rotation comprises a slot in said one end of said female member and a pin extending radially outwardly from said male member receivable in the slot when the male member is in said locking position.

8. A connector as set forth in claim 1 wherein said means for preventing relative rotation comprises a crenelated collar on said female member and a complementary crenelated collar on said male member between said first and second end portions engageable with the crenelated collar of the female member when the male member is in said locking position.

9. A connector as set forth in claim 1 wherein said bore through the female member has a chamfer at each end thereof, the chamfer at said one end of the bore being more gradual than the chamfer at said other end of the bore whereby the male member requires relatively low force to be inserted into the female member and somewhat greater force to be withdrawn from the female member.

10. A connector as set forth in claim 9 wherein the chamfer at said one end of the bore through said female member is at an angle of approximately 30 degrees relative to the axis of said bore, and the chamfer at the other end of the bore through said female member is at an angle of approximately 45 degrees relative to the axis of the bore.

11. A connector as set forth in claim 1 wherein said second end portion of the male member is tapered in the direction away from said first end portion and said female member is tapered in the direction toward said other end of the bore whereby the male member is adapted for a close fit within said bore to minimize side-to-side movement of the male member within the bore.

12. A connector as set forth in claim 1 wherein said spring retaining means comprises a helical spring washer, said connector further comprising stop means on the male member engagable with said female member for limiting insertion of the male member into said female member substantially beyond said locking position, said bore through the female member having a chamfer at each end thereof, the chamfer at said one end of the bore being more gradual than the chamfer at said other end of the bore whereby the male member requires relatively low force to be inserted into the female member and somewhat greater force to be withdrawn from the female member.

13. A connector as set forth in claim 12 wherein said means for preventing relative rotation comprises a slot in said one end of said female member and a pin extending radially outwardly from said male member receivable in the slot when the male member is in said locking position.

14. A connector as set forth in claim 12 wherein said means for preventing relative rotation comprises a crenelated collar on said female member and a complementary crenelated collar on said male member between said first and second end portions engageable with the crenelated collar of the female member when the male member is in said locking position.

* * * * *